Sept. 3, 1957  E. T. OAKES  2,804,831
APPARATUS FOR LAMINATING DOUGH
Original Filed April 24, 1946  3 Sheets-Sheet 1
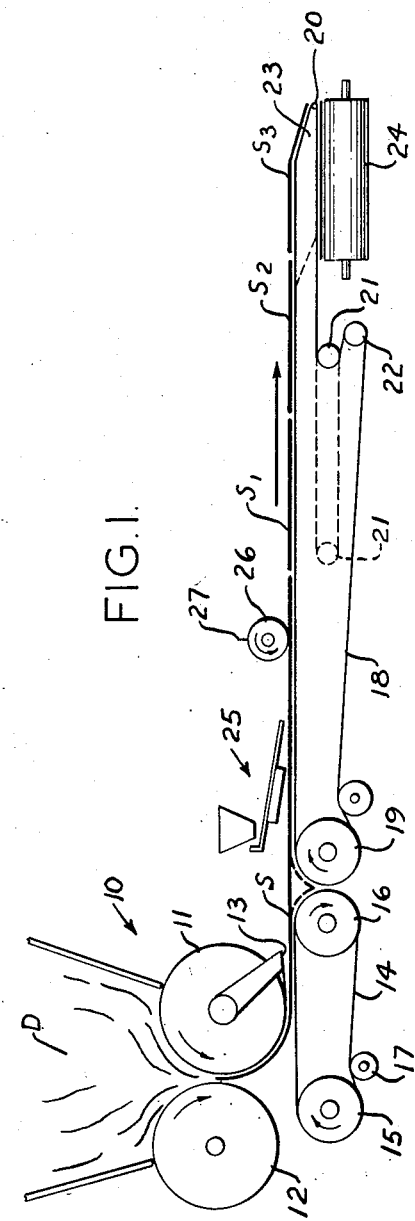
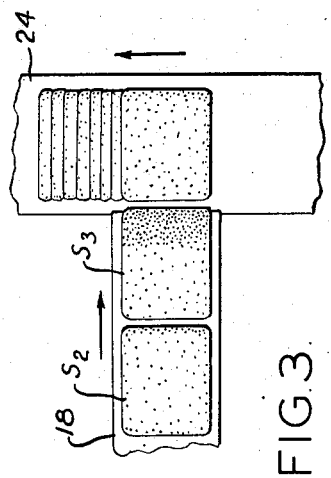
INVENTOR.
EARLE T. OAKES
BY
his ATTORNEYS

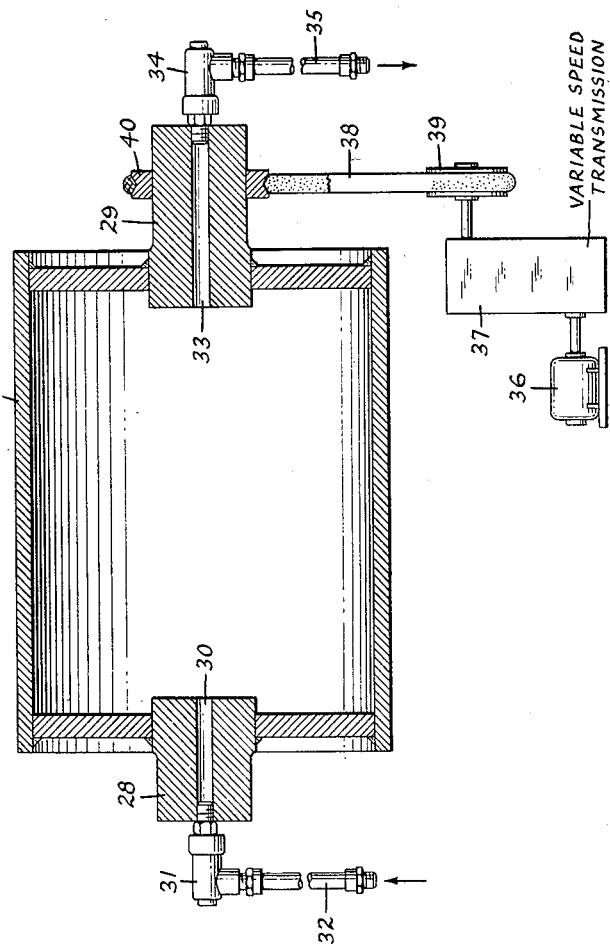

United States Patent Office 2,804,831
Patented Sept. 3, 1957

2,804,831

APPARATUS FOR LAMINATING DOUGH

Earle T. Oakes, East Islip, N. Y., assignor to The E. T. Oakes Corporation, Islip, N. Y., a corporation of New York Original application April 24, 1946, Serial No. 664,456, now Patent No. 2,687,699, dated August 31, 1954. Divided and this application April 8, 1954, Serial No. 421,864

4 Claims. (Cl. 107—1)

This invention relates to the manufacture of pastries, crackers, biscuits and the like, and it relates more particularly to apparatus for producing plain and laminated sheets of dough from which such biscuits, crackers, and the like, are made.

This is a division of my U. S. application Serial No. 664,456, filed April 24, 1946, now U. S. Patent No. 2,687,699, dated August 31, 1954.

Certain pastries and bakery products are made from sheets of dough that contain a great many extremely thin layers of dough. Such laminated sheets of dough are made by rolling a dough batch into a continuous sheet and by folding the sheet in overlapping layers. When a sufficient number of layers of thin dough have been formed, the stack is turned about 90° and passed through gauging rolls to reduce the dough to a thinner sheet. This sheet may, in turn, be folded back and forth to form overlapping layers and again the composite sheet is rolled to a desired thickness.

The above described sheeting and folding operations have a number of disadvantages. It is known that the dough is rendered tough by working it, for example, by passing it repeatedly through rollers or other sheeting devices, and that pastries or other bakery products which have been overworked do not have a flaky, tender texture. Moreover, the more the dough is handled, the greater the possibility there is of contamination of the dough.

Many attempts have been made to provide devices which would automatically form laminated sheets of dough without overworking the dough. These devices have always been extremely complicated in construction and operation because the prior inventors believed it to be necessary to combine a plurality of separate sheets of dough to form the necessary layers or lamina in the finished product. Therefore, such devices include several separate sheeting devices. Moreover, the devices provided for forming the individual sheets of dough have not been very efficient and, as a result, overworking of the dough always occurs in the dough sheeting or rolling machinery.

I have discovered that most of the disadvantages of the prior devices can be overcome and have provided a greatly simplified device whereby laminated sheets of dough suitable for making biscuits, crackers, cookies hard sweets and for treating acid type doughs can be prepared readily and automatically and without working the dough excessively.

In accordance with my invention, I have provided a conveyer system including two spaced-apart continuously driven conveyers disposed at a right angle and an intermediate intermittently driven conveyer, which is used for transferring the dough sheet from the one conveyer to the other conveyer and causing a composite sheet of dough to be deposited on the second conveyer which sheet of dough is made up of any desired number of laminations. The intermediate conveyer is provided with a feeding portion, a cutting device and a flouring device, all of which are operated intermittently so that as the sheet of dough is transferred to the intermediate conveyer and moved therealong, the sheet is cut into a plurality of shorter lengths and one side of the sheet is floured or otherwise treated. These operations take place during the motion of the intermediate conveyer. As each individual short sheet approaches the feeding portion of the conveyer, the conveyer as a whole stops and the feeding portion of the conveyer becomes operative to transfer a sheet to the transversely moving conveyer.

The timing of the intermediate conveyer and the last mentioned conveyer is arranged so that the sheets are laid one on top of the other but in slightly offset or staggered relationship to form a continuous sheet made up of a plurality of layers. The timing of the intermediate conveyer is such that its overall speed is the same as the first conveyer but, inasmuch as it is operated intermittently, its actual movement when being driven is about half again as fast as the speed of the first conveyer.

The excess portion of the sheet which is delivered by the continuously moving conveyer accumulates in a loop between the two conveyers while the transfer or intermediate conveyer is stationary. This loop or slack is taken up by the higher rate of speed of the intermediate or transfer conveyer during the period it is moving. This timed relationship makes it unnecessary to space the shorter sheets of dough one from the other and thereby greatly simplifies the operation and structure of the machine.

For a better understanding of the present invention, reference may be had to the accompanying drawings in which:

Figure 1 is a schematic illustration of a typical form of device embodying the present invention;

Figure 3 is a plan view of a portion of the pan sheeting device and transverse conveyer illustrating the manner in which the sheets of dough are placed on the transverse conveyer; and Figure 4 is a view in section through one of the rolls showing the connections for heating and cooling the roll and illustrating diagrammatically the mechanism for rotating the roll.

Figure 2:
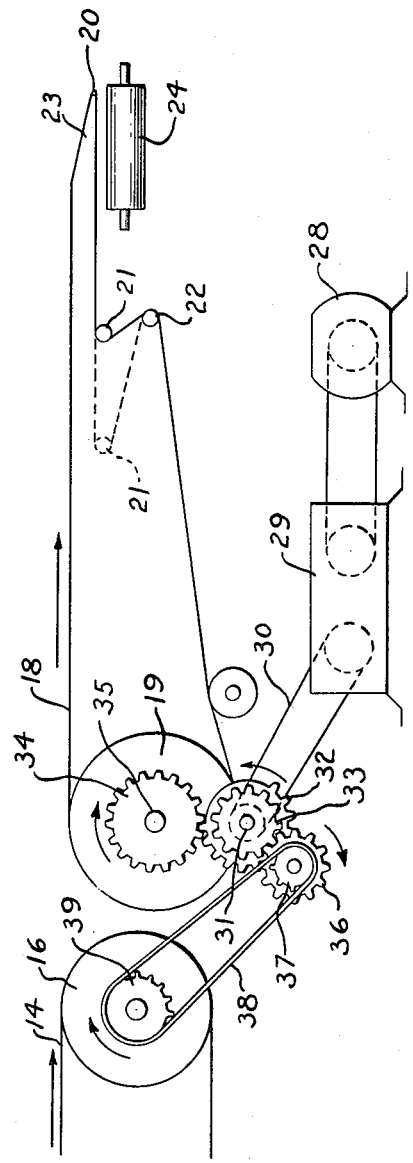
Figure 2 is a schematic illustration of the device disclosing the gearing for driving two conveyers of the system.

The form of the invention chosen for purposes of illustration may include conventional elements and may be supported on a frame and driven by mechanism which is well known in the prior art. Therefore, to emphasize the novel features of the device, only those features of the device which are believed to be essential and novel are illustrated herein.

As shown in Figure 1, the device includes a dough-rolling or sheeting mechanism 10 in which a batch of dough D is passed between a pair of rolls 11 and 12 to form a continuous sheet of dough S. The rolls 11 and 12, which are described in greater detail hereinafter, are so arranged that the sheet S tends to follow around the periphery of the roll 11 from which it is removed by means of a scraper 13.

The sheet of dough S is received on a conveyer belt 14 which is supported by means of rollers 15 and 16 at opposite ends and maintained under tension by means of a snubber roller 17. The belt 14 may be used to maintain an even tension on sheet S as it is taken from rolls 11 and 12. The dough sheet S passes from the right hand end of the conveyer belt 14 to a second conveyer belt 18 that is supported at one end by means of a driven roller 19, at its opposite end by a roller or cross bar 20 and by a pair of relatively movable rollers 21 and 22 by means of which the conveyer belt 18 is maintained under tension as the right-hand end 23 of the conveyer is reciprocated back and forth. The right hand end of the conveyer 23, and the roller 20, and the roller 21 are movable together to deposit the dough on a transverse conveyer 24.

Disposed above the conveyer belt 14 is a flouring device 25 which may be driven electrically or mechanically as desired to deposit flour or other material on the upper surface of the dough. Also above the upper surface of the conveyer is a cutting roll 26 which may be provided with a cutting blade 27 that cuts the dough into a plurality of shorter sheets S1, S2, S3, etc. as the conveyer belt 18 moves.

As shown particularly in Figures 1 and 2, the conveyers 14 and 18 are driven in the same direction by means of a motor 28 which drives a variable speed drive mechanism 29. The variable speed drive mechanism 29 is connected by means of a belt or chain 30 to a shaft 31 having a mutilated gear 32 thereon and a pinion 33. The mutilated gear 32 meshes with a gear 34 on the shaft 35 that is fixed to the roll 19. As the mutilated gear 32 rotates, the conveyer belt 18 is driven intermittently.

The pinion 33 meshes with another pinion 36 which is fixed to a smaller sprocket 37. The sprocket 37 is connected by means of a chain 38 to the sprocket 39 on the roll 16 whereby the conveyer belt 14 is driven continuously. The timed relationship between the conveyers 14 and 18 is such that in a given interval of time, for example one minute, the total distance traveled by each of the conveyers is the same, even though the conveyer 18 is stationary for a portion of that interval. For example, if the dwell of the conveyer 18 is one second and the driven time of the conveyer is two seconds, the conveyer 18 must travel the same distance in two seconds that the conveyer 14 travels in three seconds.

The dwell period of the conveyer 18 is used for transferring the short sheets of dough S1, S2 and S3 to the transverse conveyer 24. If the sheets S1, S2, S3, etc. were fed continuously, the successive sheets would have a tendency to push against each other, thereby compressing them lengthwise and forming unwanted wrinkles and ripples in the sheets. This disadvantage is overcome without the necessity of using a higher speed conveyer to separate the sheets by stopping the advance of the short sheets during the depositing operation and thereby maintaining the same spaced relationship between all of the shorter sheets. The excess portion of the sheet S that is supplied to the conveyer 18 by the conveyer 14, during the dwell period of the conveyer 18, accumulates as a loop between the conveyers 14 and 18, as indicated in dotted lines. This loop is taken up by the conveyer 18 when the conveyer is set into motion because of the higher speed of the conveyer 18.

Referring now to Figure 3, it will be clear that if the conveyer 24 is driven continuously and at slow speed, the intermittent depositing of the sheets S1, S2, S3, etc. will cause the sheets to be laid with their longitudinal axes transversely of the conveyer 24 and with the sheets in overlapping but slightly offset or staggered relationship. When the stack of sheets is passed on the conveyer 24 between additional gauging rolls (not shown) the stack of sheets will be rolled at right angles to the direction in which they were rolled during the formation of the sheet S and will be reduced to the desired thin gauge.

The above described device has the particular advantage that a layer of flour or other material is interposed between each of the sheets inasmuch as each of the sheets has its upper surface floured while the sheet S is supported by the conveyer 18.

The cutting roll 26 and the flouring device 25 may be coupled with the conveyer 18 in such a manner that they operate only during the time that the conveyer 18 is being moved.

Referring now to the dough-sheeting device 10 and the rolls 11 and 12, it has been found that many of the disadvantages inherent in the prior dough-sheeting devices can be overcome by making one or both of the rolls 11 and 12 at least 22 inches in diameter. One of the rolls, for example the roll 12, may be slightly less in diameter than the diameter of the roll 11 and it may be driven at a slightly higher rate of speed so that it will slip relatively to the sheet of dough carried by the roll 11. Such slippage has a tendency to cause the sheet S to adhere to the roll 11 with greater tenacity than it does to the roll 12. Also, the rolls may be hollow and may be heated or cooled in order to cause one of them, for example the roll 11, to carry the dough sheet with it during the sheeting operation. As shown in Figure 4, each of the rolls, for example, the roll 11, is hollow and has shafts 28 and 29 at its opposite ends to support the roll for rotation in suitable bearings or bushings, not shown. The shaft 28 has a central passage 30 connected by means of the conventional rotary union 31 to a passage 32 leading to a source of hot or cold water, as may be required, to heat or cool the roll.

The shaft 29 also has a passage 33 therein which is connected by means of a rotary union 34 to a discharge line or passage pipe 35 through which the water may be discharged from the roll.

The roll 11 and the roll 12 may be driven by a means of an electric motor 36 or the like through a variable speed transmission 37 and by means of a belt or chain 38 connecting the pulleys or sprockets 39 and 40 on the output shaft of the transmission 37 and the shaft 29, respectively. Neither of the rolls need be provided with roughened surfaces so that the sheet of dough formed will have a smooth surface, a characteristic that the dough sheets formed with knurled rolls cannot have.

The use of such large diameter rolls overcomes the necessity of applying flour to the surface of the roll 12 to prevent the sheeted dough from sticking to that surface and thus a better control over the dough sheet is obtained with the larger roll. In addition to the advantages of the use of large rolls referred to above, it has been found that the dough feeds more uniformly between the rolls 11 and 12 and less working of the dough occurs when the rolls are of larger diameter. These large rolls present a sufficiently great surface to the dough in the sheeting device to insure that sufficient dough is brought to the gap to form a sheet. The smoothness of the rolls prevents an excess of dough being delivered to the gap for the reason that as soon as sufficient dough is brought to the gap to form a full sheet a back pressure is created and the dough slips along the rolls thus preventing an excess of dough from piling up.

The use of large rolls, like those described above, in gauging devices is also advantageous for the reason that when a sheet is fed through such rolls there is no slippage and the sheet comes off the rolls smoothly.

From the preceding description, it will be apparent that I have provided devices which are capable of forming laminated sheets of dough while reducing the working of the dough to a minimum to produce products having a flakier and more tender texture.

This device without the laminating mechanism is also superior to present sheeters when cross rolling or laminating is not required.

It will be understood that the device is susceptible to considerable modification in the shape and design of the parts and in the relationship of the elements and, therefore, the form of the invention described above should be considered as illustrative and not as limiting the scope of the following claims.

I claim:

1. A device for forming laminated sheets of dough from a continuous sheet of dough, comprising a first conveyer for receiving said sheet, a second conveyer spaced from said first conveyer, means for driving said first and second conveyers substantially continuously, said second conveyer being driven slower than said first conveyer, a third conveyer interposed between said first and second conveyers for receiving said sheet from said first conveyer, cutting means overlying said third conveyer for cutting said sheet into shorter portions, said third conveyer having a reciprocable feeding end adjacent to said second conveyer for transferring said shorter sheet portions to said second conveyer, and means for alternately driving and stopping said third conveyer while said first and second conveyers are being driven and for reciprocating said feeding end while said third conveyer is stopped for stacking said shorter sheet portions one upon another in overlapping, staggered relation on said second conveyer.

2. The device set forth in claim 1 in which said second conveyer is disposed substantially at a right angle to said first conveyer.

3. A device for forming laminated sheets from a continuous sheet of dough comprising a first conveyer for receiving said sheet, a second conveyer spaced from said first conveyer, means for driving said first and second conveyers at different speeds, the second conveyer being driven slower than said first conveyer and an intermittently operated transfer mechanism between said first and second conveyers for receiving said continuous sheet from said first conveyer, means adjacent to said transfer mechanism for cutting said continuous sheet of dough into shorter sheets and said transfer mechanism having a transfer portion for advancing said shorter sheets intermittently and successively stacking them one upon another in overlapping, staggered relation on said second conveyer.

4. The device set forth in claim 3 in which said second conveyer is disposed substantially at a right angle to said first conveyer.

References Cited in the file of this patent

UNITED STATES PATENTS

| | | |
|---|---|---|
| 628,449 | Carr | July 11, 1899 |
| 1,975,326 | Loose et al. | Oct. 2, 1934 |
| 2,130,097 | Loose et al. | Sept. 13, 1938 |
| 2,478,075 | Baker | Aug. 2, 1949 |
| 2,615,404 | Crosland et al. | Oct. 28, 1952 |

FOREIGN PATENTS

| | | |
|---|---|---|
| 160,285 | Australia | Dec. 16, 1954 |
| 322,490 | Great Britain | Dec. 5, 1929 |
| 669,549 | Great Britain | Apr. 2, 1952 |